US012794101B2

(12) United States Patent
Peroulis et al.

(10) Patent No.: US 12,794,101 B2
(45) Date of Patent: Nov. 10, 2026

(54) TUNABLE FILTER AND RESONATOR MANUFACTURED WITH INJECTION MOLDING TECHNOLOGY

(71) Applicant: Purdue Research Foundation, West Lafayette, IN (US)

(72) Inventors: Dimitrios Peroulis, West Lafayette, IN (US); Michael Dimitri Sinanis, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 182 days.

(21) Appl. No.: 18/429,314

(22) Filed: Jan. 31, 2024

(65) Prior Publication Data

US 2024/0266708 A1 Aug. 8, 2024

Related U.S. Application Data

(60) Provisional application No. 63/442,989, filed on Feb. 2, 2023.

(51) Int. Cl.
*H01P 1/205* (2006.01)
*H01P 7/06* (2006.01)
*H01P 11/00* (2006.01)

(52) U.S. Cl.
CPC ................ *H01P 7/06* (2013.01); *H01P 1/205* (2013.01); *H01P 1/2053* (2013.01); *H01P 11/008* (2013.01)

(58) Field of Classification Search
CPC ........ H01P 1/202; H01P 1/205; H01P 1/2053; H01P 1/208; H01P 1/2082; H01P 1/20; H01P 1/201; H01P 7/06; H01P 7/04
USPC ........................................ 333/233, 232, 231
See application file for complete search history.

(56) References Cited

U.S. PATENT DOCUMENTS 5,329,687 A * 7/1994 Scott ....................... C23C 18/38 333/202
9,024,709 B2 5/2015 Joshi et al.
2013/0057364 A1* 3/2013 Kesler ...................... H01Q 7/00 333/219.2
2020/0076033 A1* 3/2020 Tkadlec .................. H01P 1/207
2024/0120631 A1* 4/2024 Wang ...................... H01P 1/208

OTHER PUBLICATIONS

New Scale Technologies, M3-L Linear Actuator, Jan. 1, 2023 (Year: 2023).*

(Continued)

*Primary Examiner* — Stephen E. Jones
(74) *Attorney, Agent, or Firm* — Purdue Research Foundation

(57) ABSTRACT

A tunable radio frequency (RF) resonator may include an RF cavity core defining an RF cavity. The RF cavity core may include a post positioned within the RF cavity. The tunable RF resonator may further include a flexible membrane covering the RF cavity. A gap may be defined between the flexible membrane and the post. An actuator may cause movement of the flexible membrane and vary the distance between the membrane and the post. The RF cavity core is may be injection molded plastic with a metalized electro-plating.

15 Claims, 6 Drawing Sheets

(56) References Cited

OTHER PUBLICATIONS

Zhao, K. et al., "Monolithic SLA-Based Capacitively-loaded High-Q Coaxial Resonators and Bandpass Filters," in the Proceedings of the 2020 50th European Microwave Conference (EuMC), Jan. 2021; pp. 471-474.
Arif, M. S. et al., "A High-Q Magnetostatically-tunable All-silicon Evanescent Cavity Resonator," in the Proceedings of the 2011 IEEE MTT-S International Microwave Symposium, Dec. 2011; pp. 1-4.
Hickle, M. D. et al., "Tunable High-Isolation W-Band Bandstop Filters," in the Proceedings of the 2015 IEEE MTT-S International Microwave Symposium, May 2015, pp. 1-4.
Naglich, E. J. et al., "High-Q Tunable Bandstop Filters with Adaptable Bandwidth and Pole Allocation," in the Proceedings of the 2011 IEEE MTT-S International Microwave Symposium, Jun. 2011, pp. 1-4.
Naglich, E. J. et all, "High-Q MEMS-tunable W-band Bandstop Resonators," in the Proceedings of the 2014 IEEE MTT-S International Microwave Symposium (IMS2014), Oct. 2014, pp. 1-3.
Yang, Z.-A., et al. "Design and Optimization of Tunable Silicon-Integrated Evanescent-Mode Bandpass Filters," In IEEE Transactions on Microwave Theory and Techniques, vol. 66, No. 4, Apr. 2018 (first published Feb. 14, 2018); pp. 1790-1803.
Abdelfattah, M. et al., "High-Q Tunable Evanescent-Mode Cavity SIW Resonators and Filters With Contactless Tuners," IEEE Transactions on Microwave Theory and Techniques, vol. 67, No. 9, Sep. 4, 2019 (first published Jul. 15, 2019); pp. 3661-3672.
Park, S.-J. et al., "High-Q RF-MEMS 4-6-GHz Tunable Evanescent-Mode Cavity Filter," IEEE Transactions on Microwave Theory and Techniques, vol. 58, No. 2, Feb. 12, 2010 (first published Jan. 26, 2020); pp. 381-389.
Chen, K. et al., "Power Handling of High-Q Evanescent-Mode Tunable Filter With Integrated Piezoelectric Actuators," in 2012 IEEE MTT-S International Microwave Symposium Digest, Jun. 2012, pp. 1-3.
Zhao, K. et al., "A Monolithic Vertical Integration Concept for Compact Coaxial-Resonator-Based Bandpass Filters Using Additive Manufacturing," IEEE Microwave and Wireless Components Letters, vol. 31, No. 6, Jun. 2021 (first published Mar. 1, 2021); pp. 689-692.
Sinanis, M. D. et al., "A 2.2-4.2 GHz Low-Loss Tunable Bandpass Filter Based on Low Cost Manufacturing of ABS Polymer," in Proc. 2018 IEEE 19th Wireless Microwave Technology Conference (WAMICON), Apr. 2018; pp. 1-4.
Hickle, M. D. et al., "A Widely-Tunable Substrate-Integrated Balun Filter," in IEEE MTT-S Int. Microw. Symp. Dig., Jun. 2017, pp. 274-277.
Adhikari, P. et al., "A PCB Technology-Based 22-42-GHz Quasi-Absorptive Bandstop Filter," IEEE Microwave and Wireless Components Letters, vol. 28, No. 11, Nov. 2018 (first published Sep. 10, 2018); pp. 975-977.
Sorocki, J. et al., "Application of 3-D Printing Technology for the Realization of High-Performance Directional Couplers in Suspended Stripline Technique," IEEE Transactions on Components, Packaging and Manufacturing Technology, vol. 9, No. 8, Aug. 2019 (first published Mar. 7, 2019); pp. 1652-1658.
Yang, Z. et al., "Design and Optimization of Bidirectional Tunable MEMS All-Silicon Evanescent-Mode Cavity Filter," IEEE Transactions on Microwave Theory and Techniques, vol. 68, No. 6, Jun. 2020 (first published Mar. 4, 2020); pp. 2398-2408.

* cited by examiner

TUNABLE FILTER AND RESONATOR MANUFACTURED WITH INJECTION MOLDING TECHNOLOGY

CROSS REFERENCE TO RELATED APPLICATIONS

This application claims the benefit of U.S. Provisional Application No. 63/442,989 filed Feb. 2, 2023, the entirety of which is hereby incorporated by reference.

TECHNICAL FIELD

This disclosure relates to wireless communication and, in particular, to resonators.

BACKGROUND

In recent years, much interest has been shown to generate high-performance devices for wireless communications. Simultaneously, 3D printing technologies continue to generate better results as the industry delivers machines that can match higher standards in geometrical tolerances and expand into new materials with a broad portfolio of properties.

Injection molding of thermoplastics is used widely on everyday-use products. In recent years, micro-IM technology has advanced to deliver parts with tight tolerances on the order of microns. These can be successfully metalized with finely finished surfaces while producing parts with complex 3D geometries, providing a significantly lower cost per part and lower weight per volume, with the same or better characteristics of a machined part. Moreover, micro-IMs have the potential to generate components for higher frequency bands as well, as they can maintain the required micrometer-scale tolerances.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

The roll-out of 5th generation (5G) wireless communication technology is constantly demanding the increase of available communication bands. The next generation of factory equipment, vehicles, and personal devices will generate and transmit massive amounts of data in real-time. These 5G communication networks require a significant increase in the available channels. The challenge lies in the coexistence of all these channels without interference between them. Currently, more than 50 frequency bands are used in 4G networks, and it is expected that they will increase to 75 or 100 as more advanced 5G networks are rolled out globally, thereby expanding the complexity of the RF front-end. Moreover, 100× increase in the network at the edge through the introduction of small cell towers exponentially increases hardware costs and requires a higher degree of self-configuration. A recent report estimates that 45 million 5G small cell towers would be installed by the end of 2031. Reconfigurable filters offer an alternative solution to lower costs and increase the performance of small cell station.

Evanescent-mode (EVA) resonators are capable of delivering high-performance devices. Most recently, efforts have been focused on minimizing manufacturing costs while preserving performance. Hickle has shown promising results with printed circuit board (PCB) manufacturing, demonstrating wide tunability of 91% tuning range, from 3.2-6.1 GHz. Simultaneously, this manufacturing method is in line with the current manufacturing method of millimeter-wave components for cost reduction. Research has also been advancing for EVA-mode devices to match the demand of 5G for higher frequencies by pushing the PCB manufacturing boundaries. In a high frequency band-stop filter is shown tuning from 22-42 GHz with performance with less than 1 dB out-of-band insertion loss. Advancements in well-established technologies, such as injection molding (IM), are candidates for lower cost, high performance, scalable manufacturing, and great potential to deliver on these research efforts.

The disclosure herein demonstrates low-cost and high-performance through manufacturing with IM technology of an air-filled EVA-mode resonator and a bandpass filter (BPF). In various embodiments, an unloaded quality factor ($Q_u$) ranging from 1548-2573 was measured, representing state-of-the-art performance and a record power-handling of more than 100 W.

Figure 1:
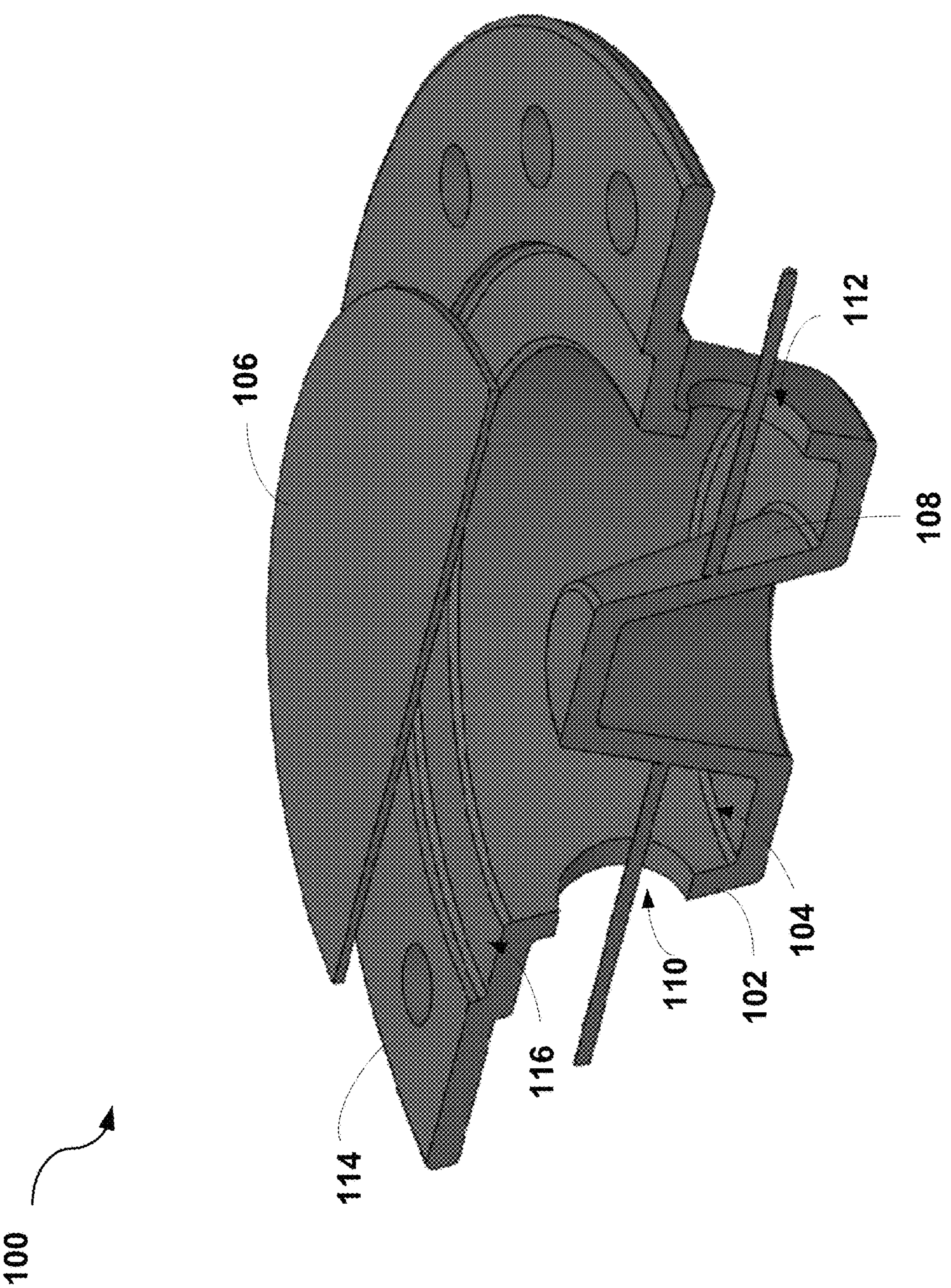
FIG. 1 illustrates an example of an exploded cross-section of an RF cavity resonator.

FIG. 1 illustrates an example of an exploded cross-section of an RF cavity resonator 100. The RF cavity resonator 100 may include a RF Cavity Core (core) 102. The core 102 may define an RF cavity 104. The RF cavity 104 may be further defined by a flexible membrane 106 which is attached to the RF cavity core 102.

The RF cavity core 102 may further include a post 108 centrally positioned within the RF cavity 104. The post 108 may include a protrusion within the RF cavity 104 that extends from a base end of the RF cavity core 102 toward the flexible membrane 106. A gap may be defined between the flexible membrane 106 and an end of the post 108. The RF cavity core 102 may further include an input port to the cavity an output port from the cavity.

The RF Cavity core 102 may further include a flange 114 around an outer perimeter of the resonator. The flange 114 may be an annular disk and define a recess 116 in which the flexible membrane is received. The flange 114 may include a plurality of holes to receive fasteners for assembly. The RF cavity core may be an injection molded plastic with a metalized plating.

One example of a technical advancement is that post 108 may be tapered such that a first width of the post proximate to the membrane is smaller than a second width of the post proximate to a base end of the RF cavity core. Likewise, the RF cavity 104 may be tapered such that a first width of the RF cavity proximate to the membrane is wider than a second width of the cavity proximate to a base end of the RF cavity core.

In some examples and in another manner of description, the RF cavity core 102 may include a first recess and a second recess within the first recess. The second recess may define the RF cavity 104. The flexible membrane 106 may be positioned within the first recess and the post 108 may be positioned within the second recess.

Figure 2:
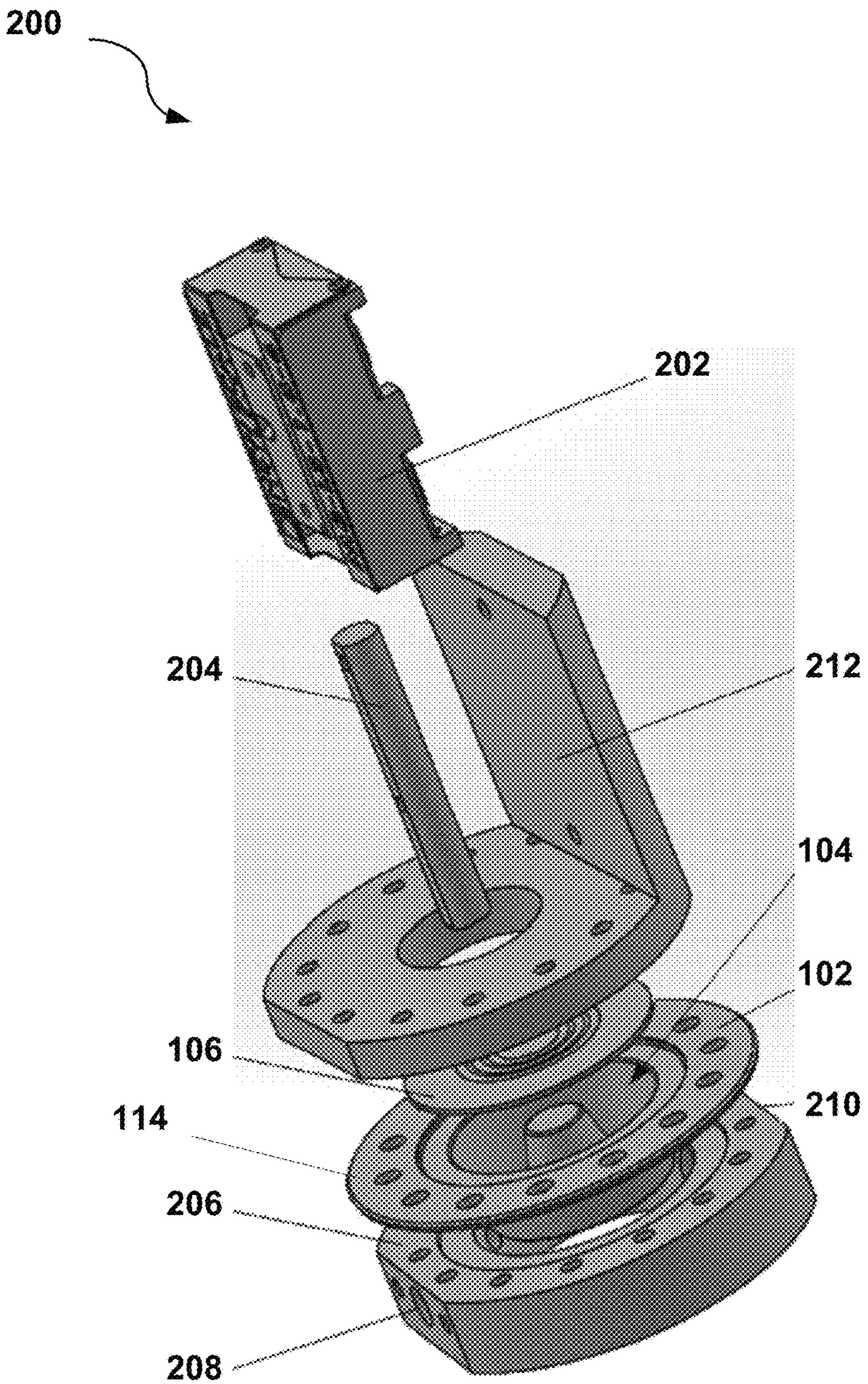
FIG. 2 illustrates an example of a tunable RF resonator assembly including an RF cavity core.

FIG. 2 illustrates an example of a tunable RF resonator assembly 200 including the RF cavity core 102. The tunable RF resonator assembly may include a linear actuator 202 which causes movement of the flexible membrane 106 and varies the distance between the membrane 106 and the post. A stub 204 may be connected to the linear actuator. The stub may include a member, such as an elongated bar, which engages the flexible membrane. For example, the actuator 202 may be connected to the stub 204, and push/pull the sub. The sub may, in turn, push and/or pull the tuning membrane 106.

The tunable RF resonator assembly 200 may include a base fixture 206 having an input port 208 and an output port 210 may receive the RF cavity core 102 such that the input port 208 and output port 210 of the base fixture are respectively aligned with the input port and the output port of the RF cavity core 102.

The tunable RF resonator may include an actuator fixture 212. The actuator fixture may be coupled to the linear actuator 202 and the RF cavity core 102. The RF cavity core 102 may be coupled to the base fixture 206. The RF cavity core 102 may include a flange 114 comprising a plurality of mounting holes which receive mechanical fixtures for affixing the RF cavity core 102 to the base fixture 108, actuator fixture 212, or any other component.

Figure 3:
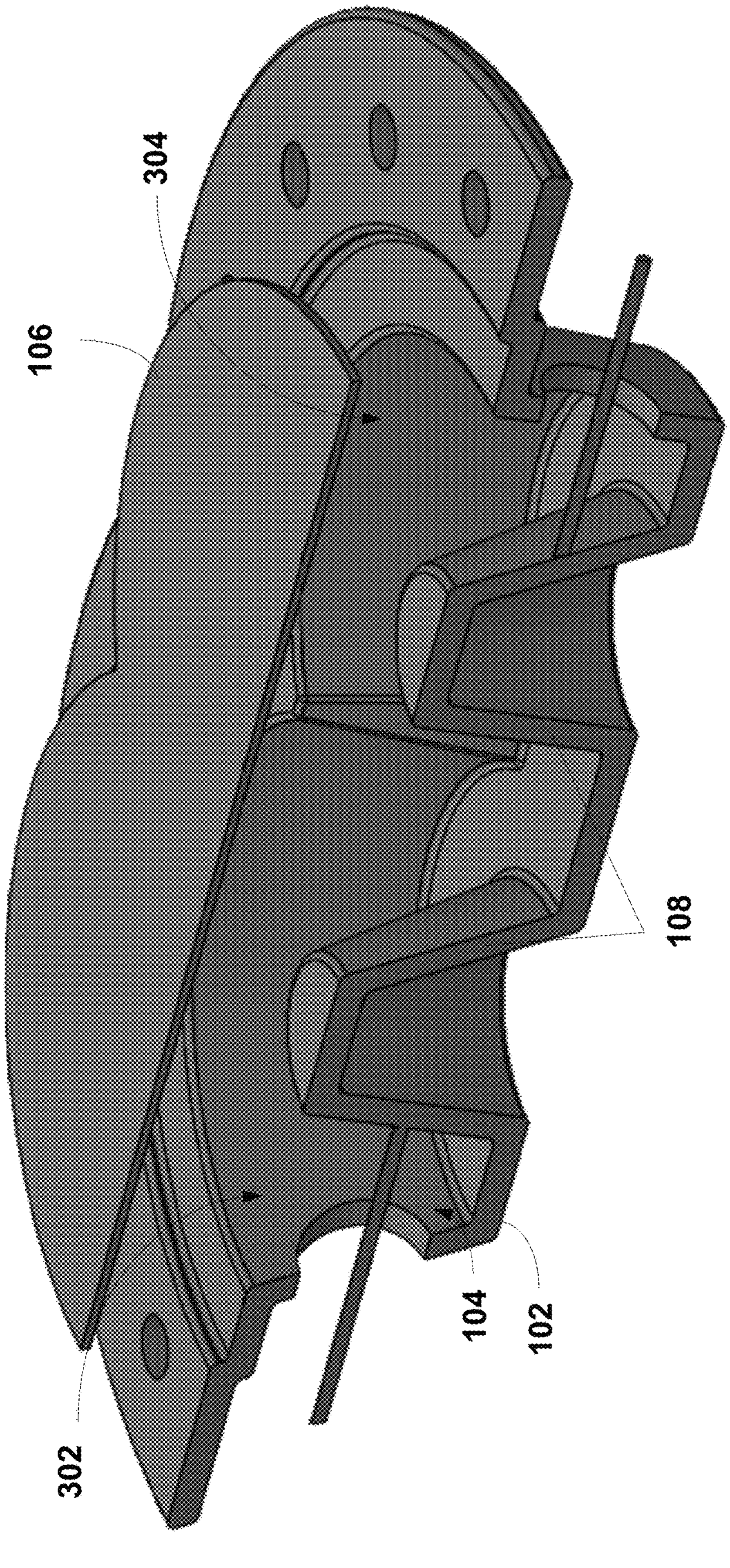
FIG. 3 illustrates a second example of an RF cavity core.

FIG. 3 illustrates a second example of a RF cavity core 102 which may be used in filtering applications. The RF cavity core 102 may define an RF cavity 104 with multiple posts 108 disposed therein. The RF Cavity 104 may be connected chambers 302, 304 where each chamber is defined a respective post 108 and a wall of the RF cavity core which at least partially encircles the reserve posts 108. The volume of each of the chambers 302, 304 may vary. For example, as shown in FIG. 3, a first chamber 302 may have a larger volume than a second chamber 304.

A tunable membrane 106 may be positioned on top of the RF cavity core 104. The tunable membrane may have cover each of the cambers. For example, the tunable membrane may have multiple tuning sections positioned above the chambers 302, 304, respectively. The area of the tuning sections may vary based on the volume of the chambers 302, 304. For example a first tuning section for the first chamber 302 have a larger area than a second tuning section for the second chamber 304.

Figure 4:
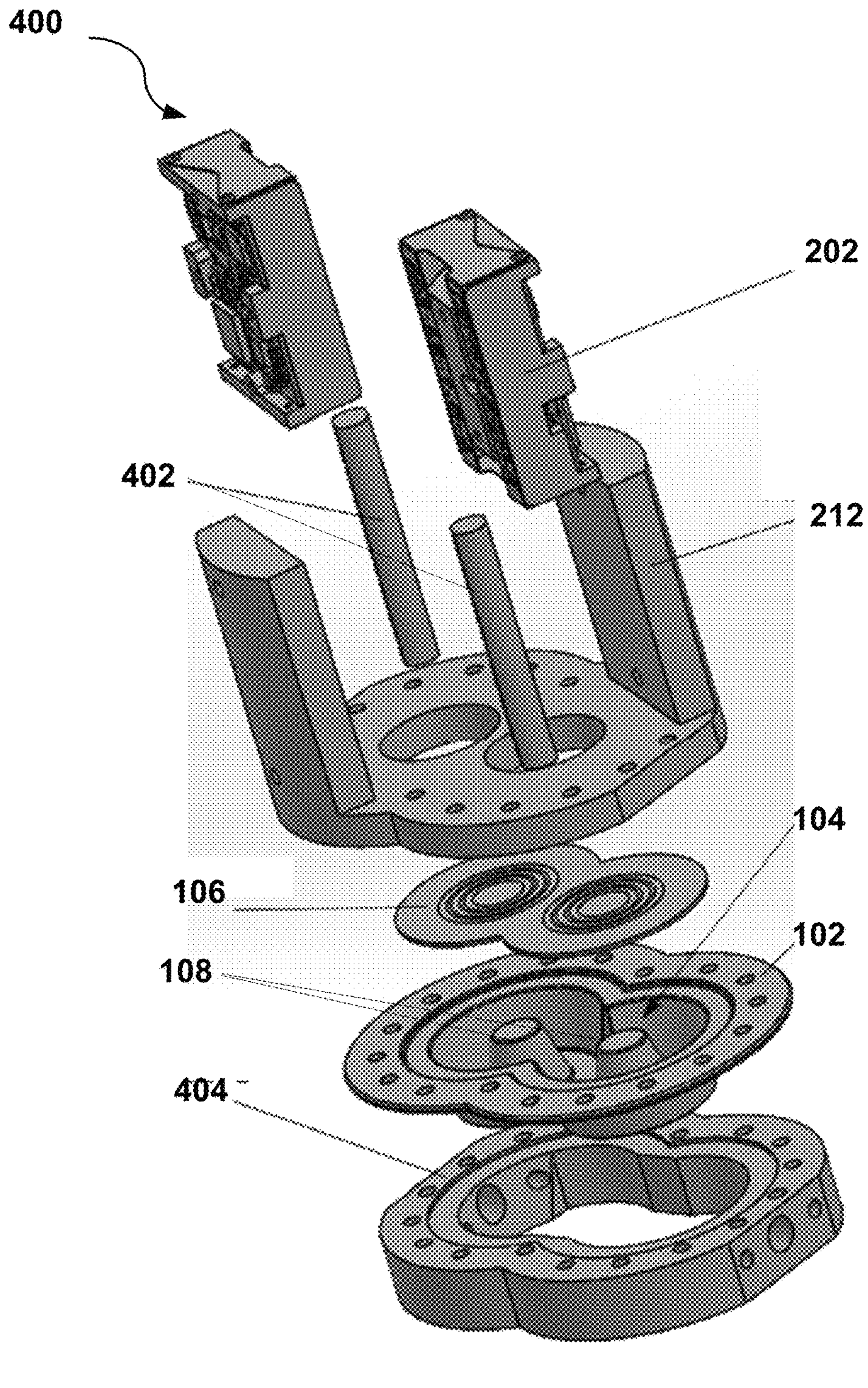
FIG. 4 illustrates an example of a tunable RF filter assembly.

FIG. 4 illustrates an example of a tunable RF filter assembly 400. The tunable RF filter assembly 400 may include the RF cavity core 102 with multiple posts 108. The tunable RF filter assembly may further include a multiple linear actuators 202 configured to cause movement of the membrane 106 at various locations on the membrane above the posts 108 and vary the distance between the membrane 106 and the posts 108, respectively. Stubs 402 may be connected to the linear actuators, respectively. The stubs may engage the flexible membrane 106 at locations proximate to the posts, respectively.

The tunable RF filter may further include a base fixture 404 having an input port and an output port. The base fixture 404 may receive the RF cavity core 102 such that the input port and output port of the base fixture are respectively aligned with the input port and the output port of the RF cavity core 102.

The tunable RF filter assembly 400 may further include an actuator fixture 202. The actuator fixture 406 may be coupled to the multiple linear actuators 202 and to the RF cavity core 102. The RF cavity core 102 may be coupled to the base fixture 404. The RF cavity core 102 may include a flange comprising a plurality of mounting holes which receive mechanical fixtures for affixing the RF cavity core 102 to the base fixture 404, actuator fixture 212, or any other component.

In the examples shown in FIGS. 1-4 and other examples described herein, actuation is performed using a commercially available submicron linear positioner, however additional or alternative methods of actuation are possible including electrostatic, magneto-static, and piezo-static technologies. Further, one crucial structural parameter is the bonding of the membrane and RF cavity core to create an air cavity. Different methods have been demonstrated using mechanical pressure, conductive epoxy, and thermo-compression bonding. In the various experimentation demonstrated in this disclosure, a mechanical bonding technique is used for simplicity, though other methods are possible.

Figure 5:
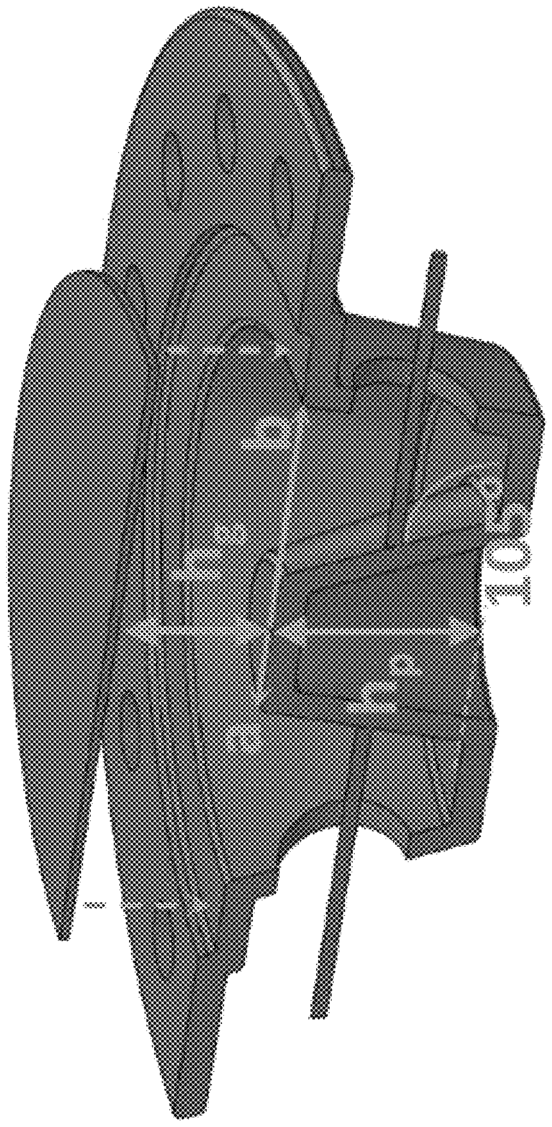
FIG. 5 illustrates a view of a RF cavity core showing various dimensions.

FIG. 5 illustrates a view of a RF cavity core showing various dimensions. There may be three critical dimensions and geometry for design optimization: (1) the RF gap (hg), which is modulated to create the frequency tuning between the flexible membrane and the center post; (2) the height of the post (hp); and (3) the angled walls, which are critical for maintaining smooth surface roughness during the injection molding process. The tuning element on top of the post-loaded cavity resonator was implemented using a liquid crystal polymer (LCP) membrane metalized with copper on one side (Ultralam 3850 by Rogers Corp.). A commercial linear actuator (M3L-S by New Scale Technologies), moves the membrane by changing the gap (hg) vertically. Based on the dimensions of the EVA-mode air-filled cavity summarized in Table 1, its resonance frequency (f0) can be calculated using the following equation:

$$f_0 = \frac{1}{2\pi\sqrt{L_{cav}C_{eqv}}} \tag{1}$$

where cavity inductance (Lcav) is given belowV $$L_{cav} = \left|\frac{1}{6\pi\times10^8}\sqrt{\frac{\mu_0}{\epsilon_0}}\ln\left(\frac{b}{a}\right)h_p.\right. \tag{2}$$

$Cs_{eqv}$ is the total approximate capacitance between the post and membrane $C_{pm}$ and the post and the cavity $C_{pc}$, and can be calculated using the following equations:

$$C_{eqv} = C_{pm} + C_{pc} \tag{3}$$

$$C_{pm} \approx \frac{\epsilon_0 \pi a^2}{h_g} \tag{4}$$

$$C_{pc} \approx \frac{2\pi}{6\times10^8\sqrt{\frac{\mu_0}{\epsilon_0}}\ln\left(\frac{b}{a}\right)}h_p. \tag{5}$$

Other important parameters of the RF cavity resonator are described as follows. The frequency tuning of the resonator depends primarily on $C_{pm}$. A change in the gap height hg between the post and the membrane changes $C_{pm}$, thus changing the resonant frequency and tuning the resonator. In this particular resonator design, the lowest gap considered is 45.7 μm, which corresponds to the lowest resonance frequency of 2.0 GHz, and the highest gap is 540 μm, which corresponds to the highest resonance frequency of 5.0 GHZ.

TABLE 1

| Possible EVA-cavity resonator parameters. | |
|---|---|
| Parameter | Value |
| Post radius, a | 3.0 mm |
| Gap (min-max), $h_g$ | 45.7-540 μm |
| Post height, $h_p$ | 6.8 mm |
| Cavity radius, b | 10.0 mm |

$Q_u$ is an important parameter of a resonator circuit and indicates the loss associated with the resonator (a lower loss implies a higher $Q_u$). In general, resonators suffer losses due to conductor loss, dielectric loss, and radiation loss. With an air-filled cavity, the IM resonator had the lowest possible dielectric loss. Radiation loss is also low because of the close contact between the flexible ceiling and cavity. To minimize conductor loss, the IM technology implementation aimed at a high surface finish for the part, which was maintained during metalization by utilizing a reverse power plating (RPP) method ($R_a$=0.31 μm)

Figure 6:
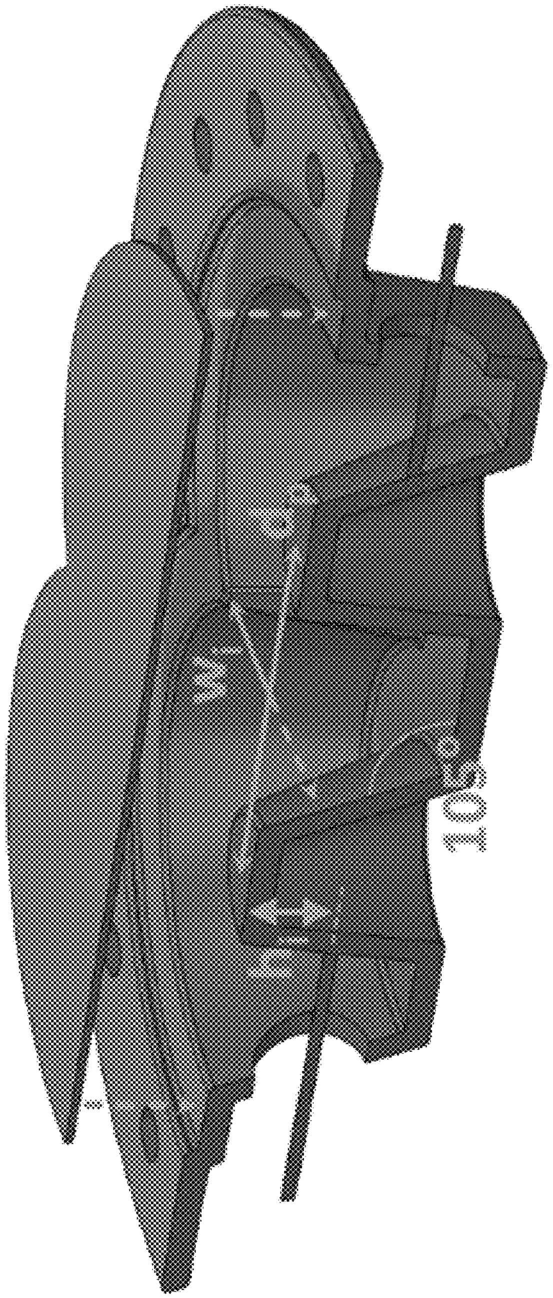
FIG. 6 illustrates a view of an RF cavity core for filtering showing various dimensions.

FIG. 6 illustrates a view of an RF cavity core for filtering showing various dimensions. A two-pole reconfigurable band pass filter utilizing the EVA-mode cavity resonator was designed using standard coupling synthesis techniques to demonstrate the proposed manufacturing method and validate its performance. An example of design dimensions summarized in Table 2, though additional or alternative dimension are possible. The flexible membrane that encloses the cavity serves as the tuning element. A section cut of the device shows the internal structure of the cavity and its design parameters.

TABLE 2

| Designed EVA-cavity filter parameters. | |
|---|---|
| Parameter | Value |
| Post radius, a | 3.0 mm |
| Gap (min-max), $h_g$ | 101-588 μm |
| Post height, $h_p$ | 6.8 mm |
| RF input height, $h_i$ | 3.5 mm |
| Cavity radius, b | 10.0 mm |
| Post distance, $d_p$ | 16.0 mm |
| Iris width, $w_i$ | 13.0 mm |

The filter response type and fractional bandwidth (FBW) depend on the cavities' external input/output and inter-resonator couplings. The external couplings are evaluated by the external quality factor $Q_e$, and the inter-resonator coupling $k_{12}$ is evaluated by the even-mode ($f_m$) and odd-mode ($f_e$) resonance frequencies of a coupled-resonator system. In one embodiment, a Chebyshev BPF response at 2.8 GHz ($h_g$=101 μm) with 7.6% FBW and 30 dB minimum return loss is initially designed, with calculated coupling values $Q_e$=4.76, and $k_{12}$=0.22. A highly coupled response is chosen to achieve low insertion loss in the passband.

The required external coupling was realized by an RF connector inserted through the sidewall of the cavity and short circuited on the metalized sidewall of the capacitive post. The coupling strength is controlled by the distance of the pin from the top of the post, as shown by dimension $h_i$ in FIG. 6. The closer the pin is to the top of the post (smaller $h_i$), the stronger the external coupling becomes. Ensuring that the tip of the pin makes good contact with the sidewall of the post is also important. If the contact between the pin and the post is poor, the coupling is reduced. To determine the dimension $h_i$, a single EVA-mode cavity resonator fed by an RF connector is simulated in HFSS, and the required $Q_e$ for a given $h_i$ is extracted from $S_{11}$ using the group delay method, where $Q_e=2\pi f_0 T(f_0)/4$, and $T(f_0)$ is the reflection group delay at resonance. In an embodiment, the pin was located 3.5 mm below the top of the post to achieve a desired $Q_e$.

The iris located between the two resonators implements the necessary inter-resonator coupling, where the dimensions $W_i$ and $d_p$ shown in FIG. 6, along with the overall shape of the iris, determine the coupling strength. The closer the two posts are together (smaller $d_p$), or the wider the iris opening (larger Wi), the stronger the coupling. To determine the dimensions $W_i$ and $d_p$, two iris coupled EVA-mode cavity resonators without RF connectors are simulated in the eigen-mode solver of the HFSS. For a given set of dimensions $W_i$ and $d_p$, the even- and odd-mode resonance frequencies were extracted and the coupling coefficient was calculated using $$K_{12} = (f_e^2 - f_m^2)/(f_e^2 + f_m^2) \tag{6}$$

The iris dimensions providing the $k_{12}$ were determined to be $W_i$=13 mm and $d_p$=16 mm.

Finally, a flexible membrane is used to enclose the cavity top to provide vertical movement and control the air gap ($h_g$) to tune the filter. An LCP layer was mechanically pressed against the sidewalls to achieve good contact, thus maintaining a high $Q_u$. Two external microactuators individually control the two separate tuners, changing $h_g$ from 101 μm to 588 μm, thus tuning the filter from 2.8 to 5.2 GHz.

Technological limitations and capabilities were considered to define a desirable design for part manufacturing, part assembly, and device performance. Design constraints may change certain aspects of a commercially manufactured resonator or filter using the advancements described herein. One parameter carefully considered herein is the flexible upper wall of the air-filled cavity, which serves as a tuning element. An external actuator facilitates its accurate movement to control the resonant frequency of the device. As such, the large diameter of the tuning membrane allows for more deflection, which dictates the resonator tuning range. The geometrical characteristics, such as the diameter of the post, the diameter of the cavity, depth of the cavity, and actuation length of the membrane, will be modified in the RF design and will be analytically explained herein.

Finally, it should be appreciated that while injection molding technology has provided an avenue by which the embodiments disclosed herein were explored, injection molding technology itself is not necessarily a limitation of manufacturing the embodiments described herein.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

While various embodiments have been described, it will be apparent to those of ordinary skill in the art that many more embodiments and implementations are possible. Accordingly, the embodiments described herein are examples, not the only possible embodiments and implementations.

What is claimed is:

1. A tunable RF resonator, comprising:

an RF cavity core defining an RF cavity, the RF cavity core further comprising a post positioned within the RF cavity, a flexible membrane covering the RF cavity, wherein a gap is defined between the flexible membrane and the post;

an actuator configured to cause movement of the flexible membrane and vary the distance between the membrane and the post; and a base fixture having an input port and an output port, the base fixture defining a hole, wherein at least a portion of the RF cavity core is disposed in the hole of the base fixture, wherein the input port and output port of the base fixture are respectively aligned with an input port and an output port of the RF cavity core, wherein the RF cavity core is an injection molded plastic with a metalized electroplating.

2. The tunable RF resonator of claim 1, wherein the RF cavity core includes a first recess and a second recess within the first recess, the second recess comprising the RF cavity, wherein the flexible membrane is positioned within the first recess and the post is disposed in the second recess.

3. The tunable RF resonator of claim 1, wherein the injection molded plastic is ABS and the metalized electroplating is copper.

4. The tunable RF resonator of claim 1, wherein the post is tapered such that a first width of the post proximate to the membrane is smaller than a second width of the post proximate to a base of the RF cavity core.

5. The tunable RF resonator of claim 1, wherein the RF cavity is tapered such that a first width of the RF cavity proximate to the membrane is wider than a second width of the cavity proximate to a base of the RF cavity core.

6. The tunable RF resonator of claim 1, further comprising a stub connected to the actuator, wherein the stub engages the flexible membrane.

7. The tunable RF resonator of claim 1, further comprising an actuator fixture, wherein the actuator fixture is coupled to the actuator and the RF cavity core, and the RF cavity core is coupled to the base fixture.

8. The tunable RF resonator of claim 1, wherein the RF cavity core further comprises a flange comprising a plurality of mounting holes.

9. A tunable RF filter, comprising:

an RF cavity core defining an RF cavity, the RF cavity core further comprising a plurality of posts positioned within the RF cavity, a flexible membrane covering the RF cavity, wherein gaps are defined between the flexible membrane and the posts;

a plurality of actuators configured to cause movement of the flexible membrane at different locations on the membrane and vary the distance between the membrane and the posts; and a base fixture having an input port and an output port, the base fixture defining a hole, wherein at least a portion of the RF cavity core is disposed in the hole of the base fixture, wherein the input port and output port of the base fixture are respectively aligned with an input port and an output port of the RF cavity core, wherein the RF cavity core is an injection molded plastic with a metalized electroplating.

10. The tunable RF filter of claim 9, wherein the RF cavity core includes a first recess and a second recess within the first recess, the second recess defining the RF cavity, wherein the flexible membrane is positioned within the first recess and the posts are disposed within the second recess.

11. The tunable RF filter of claim 9, wherein the injection molded plastic is ABS.

12. The tunable RF filter of claim 9, wherein at least one of the posts is tapered such that a first width of the post proximate to the membrane is smaller than a second width of the post proximate to a base of the RF cavity core.

13. The tunable RF filter of claim 9, further comprising a stub connected to the actuator, wherein the stub is configured to engage the flexible membrane.

14. The tunable RF filter of claim 9, further comprising an actuator fixture, wherein the actuator fixture is coupled to the actuators and the RF cavity core, and the RF cavity core is coupled to the base fixture.

15. The tunable RF filter of claim 9, wherein the RF cavity core further comprises a flange comprising a plurality of mounting holes.

* * * * *